United States Patent
Loeprecht et al.

(10) Patent No.: US 12,463,485 B2
(45) Date of Patent: Nov. 4, 2025

(54) POLE COVER FOR AN ELECTRIC MOTOR

(71) Applicant: AUDI AG, Ingolstadt (DE)

(72) Inventors: Malte Loeprecht, Kösching (DE);
Philipp Uhlmann, Ingolstadt (DE);
Lars Wetterau, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 211 days.

(21) Appl. No.: 18/487,965

(22) Filed: Oct. 16, 2023

(65) Prior Publication Data
US 2024/0128822 A1  Apr. 18, 2024

(30) Foreign Application Priority Data

Oct. 18, 2022 (DE) .......................... 102022127293.1

(51) Int. Cl.
| | |
|---|---|
| *H02K 3/34* | (2006.01) |
| *H02K 1/26* | (2006.01) |
| *H02K 3/30* | (2006.01) |
| *H02K 15/12* | (2006.01) |

(52) U.S. Cl.
CPC .............. *H02K 3/345* (2013.01); *H02K 1/26* (2013.01); *H02K 3/30* (2013.01); *H02K 15/12* (2013.01)

(58) Field of Classification Search
CPC ........ H02K 3/522; H02K 3/325; H02K 3/527; H02K 3/48; H02K 3/34; H02K 3/30; H02K 3/345; H02K 15/12; H02K 15/10; H02K 15/165; H02K 15/022; H02K 7/04; H02K 1/24
See application file for complete search history.

(56) References Cited

U.S. PATENT DOCUMENTS

| | | | |
|---|---|---|---|
| 9,712,027 B2 * | 7/2017 | Birolleau | ............... H02K 15/09 |
| 2013/0257214 A1 | 10/2013 | Kern et al. | |
| 2014/0360008 A1 | 12/2014 | Du et al. | |

FOREIGN PATENT DOCUMENTS

| | | |
|---|---|---|
| CN | 201846144 U | 5/2011 |
| EP | 2936659 A1 | 10/2015 |
| EP | 2936656 B1 | 6/2017 |
| WO | WO 2014098625 A1 | 6/2014 |
| WO | WO 2020020551 A1 | 1/2020 |

* cited by examiner

*Primary Examiner* — Leda T Pham
(74) *Attorney, Agent, or Firm* — Seed Intellectual Property Law Group LLP

(57) ABSTRACT

A pole cover is provided for receiving and guiding a winding on a rotor of an electric motor, comprising multiple segments which extend in a radial direction to a center axis of the pole cover, wherein the segments receive a partial region of the winding of the electric motor, and wherein each of the segments includes a winding region to receive the winding and a segment connection region for connecting to other segments, wherein the winding region and the segment connection region border on each other and the segment connection region is situated closer to the center axis than the winding region. The segment connection regions extend at least partially in the circumferential direction about the center axis and each segment connection region protrudes, in the circumferential direction about the center axis, beyond the adjoining winding region. Multiple decoupling regions are also provided, each being situated between two segment connection regions in the circumferential direction about the center axis. An electric motor having such a pole cover and a method for producing a pole cover are also provided.

12 Claims, 1 Drawing Sheet

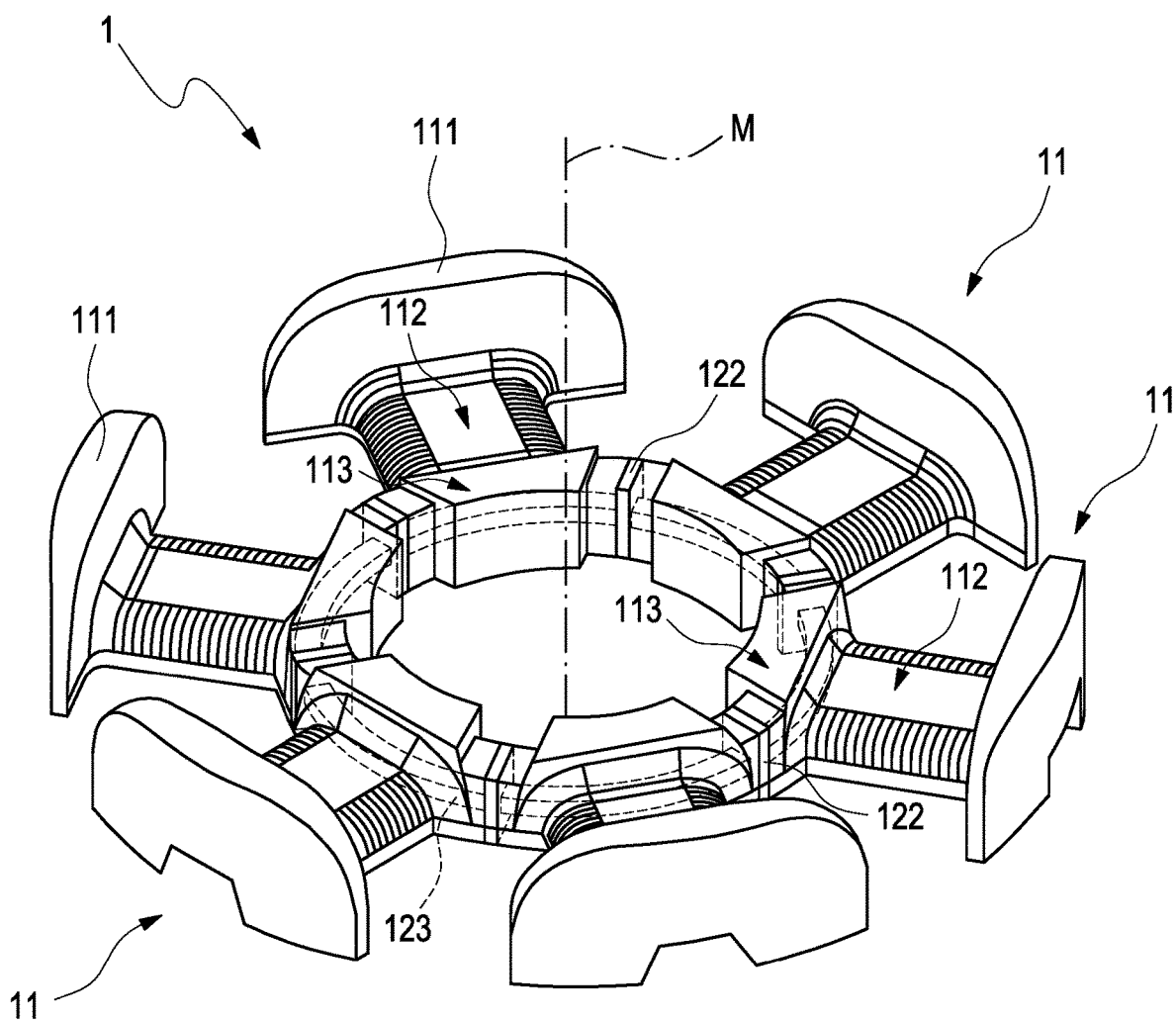

POLE COVER FOR AN ELECTRIC MOTOR

BACKGROUND

Technical Field

The present disclosure relates to a pole cover for receiving and guiding a winding on the rotor of an electric motor, comprising multiple segments which extend in the radial direction to a center axis of the pole cover. An electric motor having a pole cover and a method for producing a pole cover is also provided.

Description of the Related Art

Pole covers serve for receiving of windings on ferromagnetic cores in the stator or rotor of electric motors. Such pole covers support the winding and prevent it from shifting in its position due to centrifugal forces or other forces acting on the windings. Often a portion of these pole covers is arranged between a ferromagnetic core and the winding, which is usually formed by an insulated wire. Furthermore, pole covers usually have at their outer ends a region protruding beyond the winding, which prevents the winding, by form fitting, from moving in the radial direction away from the axis of rotation of the motor, due to centrifugal forces. Pole covers of a rotor are thus statically and dynamically loaded during the operation of the electric motor.

Usually, the stator and rotor have multiple magnetic cores or poles distributed in the circumferential direction, on each of which a winding is placed. Accordingly, pole covers may have multiple segments, each of which is connected to a ferromagnetic core during the assembly process and then provided with a winding. Known pole covers are designed to extend over multiple segments, which are connected to each other in a ring or star arrangement. Suitable materials for pole covers are plastics, such as thermosetting plastics. Thermosetting plastics are heat-resistant, which is advantageous when used inside an electric motor. Furthermore, thermosetting plastics have good compressive strength, so that a pole cover made from a thermosetting plastic can reliably brace against the centrifugal forces acting on the winding. The drawback to thermosetting plastics is that they can only withstand relatively small tensile and flexural stresses.

Thermosetting plastics are generally brittle and have only slight elongation at break. However, tensile and flexural stresses act on the material of a pole cover between the individual segments of a pole cover during the functioning of a rotor in an electric motor. In order to avoid a fracture of the pole cover in this region in dynamic operation, known pole covers have spring-loaded regions between their individual segments, which serve as a stress relief. In these spring-loaded regions the wall thickness is greatly reduced and at the same time the absorbing of stresses is favored by the configuration of these regions. For example, the spring-loaded regions are U-shaped with a slight wall thickness, so that an elastic deformation of these regions is possible, while only low tensile stresses occur in the material. The drawback to these spring-loaded regions between the segments of a pole cover is that they require relatively much design space, which is often not available inside an electric motor. Furthermore, a pole cover having such spring-loaded regions is sensitive during the assembly process and has little shape and dimension stability. Thus, the pole cover can easily become damaged or not be positioned correctly to the other components during the mounting of such a pole cover on the cores of a rotor.

The document WO2014098625A1 describes an electric motor designed as a drive unit for a fan. The stator of this electric motor comprises an insulating component, which serves on the one hand as a pole cover for the windings of the stator and on the other hand to hold the bearing for the rotor. This insulating component can be made from various plastics.

In the document WO2020020551A1 a component is described for the guidance and support of windings of the rotor of a synchronous electric motor. This component has a metallic base structure arranged on the inside, which is surrounded by a pole cover consisting of plastic. The pole cover is applied by overmolding of the metallic base structure.

The document CN201846144U describes an electric motor having a stator and a rotor, in which an insulating layer is arranged between a metallic core and the windings. This insulating layer can consist of a thermoplastic material.

BRIEF SUMMARY

Embodiments of the present disclosure provide solutions with which the mechanical load capacity and the shape stability of a pole cover of a rotor can be improved.

An example embodiment of a pole cover for receiving and guiding a winding on a rotor of an electric motor may be summarized as including:
  multiple segments which extend in the radial direction to a center axis of the pole cover, wherein the segments are designed to receive a partial region of the winding of the electric motor, each of the segments comprising a winding region to receive the winding and a segment connection region for connecting to other segments,
  wherein the winding region and the segment connection region border on each other and the segment connection region is situated closer to the center axis than the winding region,
  wherein the segment connection regions extend at least partially in the circumferential direction about the center axis and each segment connection region protrudes, in the circumferential direction about the center axis, beyond the adjoining winding region and
  multiple decoupling regions are provided, being situated each time between two segment connection regions in the circumferential direction about the center axis and each decoupling region is connected to the adjoining segment connection regions or to other decoupling regions,
  wherein the segments are made from a first plastic material and the decoupling regions consist of a second plastic material and the first plastic material is different from the second plastic material.

A pole cover according to one or more embodiments of the invention comprises multiple segments, extending in the radial direction to a center axis. This center axis of the pole cover in the installed state is congruent with the axis of rotation of an electric motor. Each of the segments is designed to receive a partial region of the winding of the electric motor. Each segment comprises at least two partial regions, which are connected to each other. The winding region is designed to receive the winding and is situated outside a segment connection region in the radial direction to the center axis. The winding region borders on the segment connection region. In some embodiments, a segment is produced in one combined work step and comprises a winding region and a segment connection region in a combined structural part. The segment connection region serves for connecting one segment to an adjacent segment in the circumferential direction to the center axis. Each segment connection region protrudes beyond the adjoining winding region at least on one side in the circumferential direction about the center axis.

In some embodiments, multiple decoupling regions are arranged between the segment connection regions. These decoupling regions are designed to absorb mechanical stresses between the segments in the operating state when the pole cover has been installed in an electric motor. In some embodiments, the decoupling regions consist of a material different from that of the segments. The segments consist of a first plastic material and the decoupling regions consist of a second plastic material, the first plastic material being different from the second plastic material. In some embodiments, it is thus possible to use for the segments a plastic material having different mechanical properties from the plastic material of which the decoupling regions consist. The segments in a pole cover for a rotor are required to be as shape-stable as possible and to have the least possible elastic deformation under dynamic loading. This will ensure that the winding of the electric motor placed on the pole cover will be held exactly in the desired position.

In order to meet these requirements, the first plastic material may be formed by a shape-stable plastic material with little elastic deformation under load. However, mechanical stresses will occur between the segments during the operation of an electric motor and they may damage the pole cover. In some embodiments, a decoupling element made from a different material is arranged between every two adjacent segment connection regions, which absorbs and compensates for these stresses. Plastics with a large elastic deformation under loading are suitable for absorbing of mechanical stresses. This requirement can be fulfilled in that the second plastic material, of which the decoupling regions consist, is formed by a plastic material with less shape stability.

Thanks to making the elements from different plastic materials, a separation of functions is achieved for the pole cover. The segments are shape-stable and therefore securely guide the windings on the rotor. The decoupling regions arranged between the segment connection regions, on the other hand, are deformable upon occurrence of mechanical stresses and thereby compensate for stresses which might lead to damage between the segments during the operation of the electric motor. The decoupling regions may be arranged to require but little design space between the segment connection regions and thus can be integrated in the pole cover in space-saving manner. Thus, the costly formations of spring-loaded regions between the segments, as is known in the prior art, are eliminated in the pole cover. In the non-installed state, the pole cover having decoupling regions made from a different material is more shape-stable than known pole covers in which spring-loaded regions are created by a reduction of the wall thickness. This makes it easier to mount the pole cover on the rotor and reduces the risk of damaging the pole cover during this installation. Thus, a pole cover described herein has better mechanical load capacity than the prior art with less design space and at the same time an enhanced shape stability during installation.

In one embodiment, the second plastic material has a larger elongation at break than the first plastic material, such as wherein the second plastic material is formed by a thermoplastic material and the first plastic material by a thermosetting material. The first plastic material and the second plastic material have different mechanical properties. The second plastic material has a larger elongation at break and thus greater elasticity than the first plastic material. Hence the second plastic material is better suited to absorbing mechanical stresses and small deformations than the first plastic material. The first plastic material, on the other hand, has a greater shape stability, which is advantageous for the fixation and guidance of the windings on the segments of the pole cover. In one embodiment, therefore, the second plastic material may be formed by a thermoplastic material and the first plastic material by a thermosetting plastic. In this embodiment, the different properties of the materials are optimally utilized. Thanks to the separation of functions of guidance of the winding by the first plastic material and absorbing of mechanical stresses during operation by the second plastic material, the overall pole cover can better withstand mechanical loads and at the same time it is shape-stable and not sensitive during the installation.

In another embodiment a connection region is arranged each time between adjacent decoupling regions, wherein each connection region is connected respectively to two decoupling regions and each connection region consists of the second plastic material, wherein the decoupling regions and the connection regions are arranged alternately in the circumferential direction about the center axis and together form a cohesive component in the circumferential direction about the center axis. In this embodiment, the decoupling regions are joined together by multiple connection regions to form a cohesive structural part. Such a cohesive structural part can be easily handled during the production of the pole cover. In this embodiment, each time alternating decoupling regions and connection regions may be arranged in the circumferential direction to the center axis, both of them consisting of the second plastic material. The cohesive structural part formed from them can be produced as a preform in a first injection molding process. The other components of the pole cover can then be added in a second injection molding process by overmolding with the first plastic material. Alternatively, it is also possible for only a few of the decoupling regions to be connected by connection regions located in between. In this way, multiple cohesive structural parts are formed, which can then be overmolded with the first plastic material.

In some embodiments, the connection regions are at least partly surrounded by the segment connection regions or border on the segment connection regions.

In this embodiment, the connection regions between the decoupling regions are partially enclosed by the segment connection regions. Alternatively, the connection regions may be arranged outside the segment connection regions, but preferably bordering on them. Finally, it is also possible for the connection regions to be completely enclosed by the segment connection regions.

In another embodiment, a decoupling region is connected by material bonding to two respective segment connection regions arranged adjacent to each other in the circumferential direction about the center axis.

Such a materially bonded connection can be easily accomplished by overmolding of the previously produced decoupling regions. The materially bonded connection is stable and space-saving. Alternatively or additionally, it is also possible for a decoupling region to be connected by form fitting to one or two adjoining segment connection regions. For this, a decoupling region may have a partial region with undercuts, for example in the form of a Christmas tree. Such a form fitting connection can also be easily realized by overmolding the previously produced decoupling regions with the first plastic material.

In one embodiment, at least one decoupling region has a cross sectional surface in a plane in which the center axis runs that corresponds substantially to the cross sectional surface of the adjoining segment connection regions.

In this embodiment, the segment connection regions and the decoupling regions situated between them have substantially the same cross sectional surface. By cross sectional surface is understood to be the surface which results from a slicing through the segment connection region in a sectioning plane running from the center axis radially outward. In this way, the pole cover is given a stable shape with no sharp-edged transitions or notches between the segments and the decoupling regions. Alternatively, it is also possible for the cross sectional surface of the decoupling regions to be larger or smaller than the cross sectional surface of the adjoining segment connection regions.

In another embodiment, each segment may include a closure element on its side facing away from the center axis, which protrudes in the circumferential direction to the center axis and/or perpendicular thereto beyond the adjoining winding region, and each segment connection region protrudes beyond the winding region in its region bordering on the winding region in the circumferential direction to the center axis or perpendicular thereto. The closure element braces on the outside a winding which has been placed on the segment or the winding region when the pole cover is installed. Furthermore, each segment connection region protrudes beyond the winding region. The protruding segment connection region also serves for bracing a winding which has been placed on the winding region in the installed state.

Some embodiments provide an electric motor having a stator and a rotor, wherein the rotor comprises at least one pole cover according to one of the previously described embodiments. The electric motor described herein comprises at least one pole cover mounted on its rotor. The pole cover encloses with its segments the ferromagnetic cores of the rotor at least partially. Each time a partial region of the winding of the rotor is mounted on the segments. During operation of the electric motor, when the rotor is turning, the segments of the pole cover guide the windings and prevent them from changing their position in unwanted manner. During the operation of the electric motor, mechanical stresses may occur on the pole cover, caused by dynamic kinetic forces of the rotor or also by thermal expansion of the components of the electric motor. These mechanical stresses are absorbed and compensated by the decoupling regions of the pole cover. Thanks to the installation of a pole cover, the mechanical load capacity of the rotor of the electric motor described herein is improved and thus a long-term safe operation of the electric motor is assured. Thanks to the good shape stability of the pole cover, the installation of the rotor of the electric motor described herein can be done easily and without risk of damage to the pole cover.

In one embodiment of the electric motor, each time a segment encloses at least partially a magnetic core of the rotor and a winding receiving a flow of current during the operation of the electric motor is arranged on each segment. The pole cover in the electric motor is arranged between the winding and a core positioned inside the winding.

Some embodiments provide a method for producing a pole cover according to one of the previously described embodiments, the method may be summarized as: producing a preform consisting of the second plastic material in a first injection molding process, wherein the preform comprises the decoupling regions, and in some embodiments the connection regions may be arranged between the decoupling regions; and overmolding of the preform in a second injection molding process with the first plastic material, wherein the segments are formed during the overmolding, and a material bonded or form fitting connection is produced during the overmolding between the decoupling regions and the adjoining segment connection regions.

In some embodiments, a pole cover according to one of the previously described embodiments is made by 2-component injection molding. For this, two injection molding processes may be carried out in succession, each time processing one kind of plastic material. After performing the second injection molding process, the partial regions of the pole cover are connected to each other at least by material bonding, optionally also by form fitting. In some embodiments, a thermosetting plastic may be used as the first plastic material in the method and a thermoplastic material as the second plastic material. In some embodiments, the method may be carried out in the indicated sequence described above. Alternatively, it is also possible to carry out the method in an alternative sequence.

In a first step of the method, a preform is first made from the second plastic material, having all the decoupling regions and in some embodiments, also the connection regions may be arranged between them. In some embodiments, a cohesive structural part may be produced in this way, which can be easily used in the second step of the method.

In a second step of the method, the remaining components of the pole cover are then formed from the first plastic material. For this, the preform produced in step of the method is overmolded in a second injection molding process and the segments are thus formed. This overmolding is done in such a way that each time two adjacent segment connection regions are interrupted by a decoupling region belonging to the preform. In this way, a mechanical decoupling is provided between the adjacent segment connection regions and thus the individual segments of the pole cover. Thanks to the production by the method described herein, the pole cover is given an improved mechanical load capacity in operation of the electric motor, as well as an improved shape stability during installation.

Features, effects, and benefits which are disclosed in connection with the pole cover and the electric motor also count as being disclosed in connection with the method. Conversely, features, effects, and benefits which are disclosed in connection with the method also count as being disclosed in connection with the pole cover and the electric motor.

BRIEF DESCRIPTION OF THE SEVERAL VIEWS OF THE DRAWINGS

Embodiments are represented schematically with the aid of the drawing and described with reference to the drawing.

FIG. 1 shows a perspective view of one embodiment of a pole cover.

DETAILED DESCRIPTION

FIG. 1 shows a perspective view of one embodiment of a pole cover 1. The center axis M runs through the center of the pole cover 1. During the assembly process, the pole cover 1 shown in FIG. 1 is shoved from above onto a shaft, surrounded by a total of six ferromagnetic cores, of the rotor. After this, an identically configured pole cover 1 is shoved on from the bottom.

The pole cover 1 shown comprises six segments 11, extending in the radial direction away from the center axis M. Each of these segments 11 comprises a segment connection region 113, which is provided to connect the segments 11 to each other. Furthermore, each segment 11 comprises a winding region 112, which borders directly on the segment connection region 113 and is situated further to the outside than the segment connection region 113 in the radial direction to the center axis M. On the outwardly facing ends of each segment 11, bordering on the winding region 112, there is arranged a respective closure element 111, which protrudes beyond the winding region 112 in the circumferential direction to the center axis M and in the direction of the center axis M. This closure element 111 serves for bracing the windings on the segments 11 against outwardly acting centrifugal forces during the rotation of the rotor and thus of the pole cover 1.

Each segment connection region 113 protrudes beyond the adjoining winding region 112 in the circumferential direction to the center axis M and in the direction of the center axis M. This protruding region makes it easier to place the winding on the winding region 112 and at the same time it braces the winding once in place during the operation of the electric motor. The pole cover 1 comprises multiple decoupling regions 122, each of them being arranged between two adjacent segment connection regions 113 in the circumferential direction to the center axis M. The decoupling regions 122 in the embodiment shown are formed by discs, consisting of a plastic material different from the segments 11. The decoupling regions 122 interrupt the pole cover 1 in the circumferential direction and are connected to each other by material bonding and/or form fitting on two opposite sides by an adjacent segment connection region 113. The segments 11 consist of a first plastic material, formed by a thermosetting plastic, which has high strength and good shape stability while at the same time having little elongation at break. The decoupling regions 122, on the other hand, consist of a second plastic material, which is formed by a thermoplastic material having a larger elongation at break and less strength and shape stability. Thus, the pole cover 1 comprises multiple segments 11, which are regularly interrupted by decoupling regions 122 made of an elastic material. In this way, the pole cover can absorb mechanical stresses occurring during the operation of the electric motor by deformation of the decoupling regions 122. Hence, these mechanical stresses constitute no danger to the segments 11 having little elongation at break.

Between every two adjacent decoupling regions 122 there is arranged a connection region 123, which likewise consists of the second, elastic plastic material. In the embodiment shown, decoupling regions 122 and connection regions 123 are arranged alternately in the circumferential direction about the center axis M and form a ring. When producing the pole cover 1, it is thus possible at first to make a preform in simple manner from the second plastic material, comprising the decoupling regions 122 and the connection regions 123. This preform is then already shape-stable and therefore it can easily be overmolded in a second process step with the first plastic material, from which the segments 11 are then formed. In the embodiment shown, the connection regions 123 are completely surrounded by the ring-shaped body 121. Alternatively, it would also be possible to arrange the connection regions 123 outside, yet bordering on the segment connection regions 113.

Each decoupling region 122 is connected by material bonding and/or form fitting to two neighboring segment connection regions 113 in the circumferential direction about the center axis M. This connection is made by overmolding of the preform, consisting of the second plastic material, with the first plastic material. In the embodiment shown, the cross sectional surface of the decoupling regions 122 corresponds to the cross sectional surface of the adjoining segment connection regions 113. By cross sectional surface is to be understood as the surface which results from a slicing through the segment connection region 113 in a sectioning plane running from the center axis M radially outward through the decoupling region 122 or the segment connection region 113. The embodiment represented in FIG. 1 shows, for example, a pole cover 1 for a rotor of an electric motor having six ferromagnetic cores, each of which is arranged in a segment 11 of the pole cover 1. Of course, the pole cover 1 can also have a different number of segments 11. Furthermore, the pole cover 1 is also suitable for installation or mounting on a stator of an electric motor.

German patent application no. 10 2022 127293.1, filed Oct. 18, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A pole cover for receiving and guiding a winding on a rotor of an electric motor, comprising:
    a plurality of segments that extend in a radial direction to a center axis of the pole cover, wherein the segments are configured to receive a partial region of the winding of the electric motor, each of the segments having a winding region to receive the winding and a segment connection region for connecting to other segments, wherein the winding region and the segment connection region border on each other and the segment connection region is situated closer to the center axis than the winding region,
    wherein the segment connection regions extend at least partially in a circumferential direction about the center axis and each segment connection region protrudes, in the circumferential direction about the center axis, beyond the winding region that adjoins the segment connection region; and
    a plurality of decoupling regions, each decoupling region positioned between two segment connection regions in the circumferential direction about the center axis and each decoupling region being connected to the segment connection regions that adjoin the decoupling region or to other decoupling regions,
    wherein the segments are made from a first plastic material and the decoupling regions are made from a second plastic material and the first plastic material is different from the second plastic material.

2. The pole cover according to claim 1, wherein the second plastic material has a larger elongation at break than the first plastic material.

3. The pole cover according to claim 1 wherein the second plastic material is formed by a thermoplastic material and the first plastic material is formed by a thermosetting material.

4. The pole cover according to claim 1, wherein a connection region is arranged each time between adjacent decoupling regions, wherein each connection region is coupled to two decoupling regions and each connection region consists of the second plastic material, wherein the decoupling regions and the connection regions are arranged alternately in the circumferential direction about the center axis and together form a cohesive component in the circumferential direction about the center axis.

5. The pole cover according to claim 4, wherein the connection regions are at least partly surrounded by the segment connection regions or border on the segment connection regions.

6. The pole cover according to claim 1, wherein the decoupling region is connected by material bonding and/or form fitting to two respective segment connection regions arranged adjacent to each other in the circumferential direction about the center axis.

7. The pole cover according to claim 1, wherein at least one decoupling region has a cross sectional surface in a plane in which the center axis runs that corresponds substantially to the cross sectional surface of the adjoining segment connection regions.

8. The pole cover according to claim 1, wherein each segment comprises a closure element on its side facing away from the center axis, which protrudes in the circumferential direction to the center axis and/or perpendicular thereto beyond the adjoining winding region, and each segment connection region protrudes beyond the winding region in its region bordering on the winding region in the circumferential direction to the center axis or perpendicular thereto.

9. An electric motor, comprising:
a stator; and
a rotor, wherein the rotor comprises at least one pole cover according to claim 1.

10. The electric motor according to claim 9 wherein each time a segment encloses at least partially a magnetic core of the rotor and a winding receiving a flow of current during the operation of the electric motor is arranged on each segment.

11. A method for producing a pole cover, comprising:
producing a preform consisting of a second plastic material in a first injection molding process, wherein the preform comprises decoupling regions; and
overmolding of the preform in a second injection molding process with a first plastic material, wherein segments are formed during the overmolding, and a material bonded or form fitting connection is produced during the overmolding between the decoupling regions and adjoining segment connection regions of the segments.

12. The method according to claim 11 wherein connection regions are arranged between the decoupling regions.

* * * * *